8763X
8,763 X
T. Fairbanks,
Cook Stove.
Patented Apr. 14. 1835.
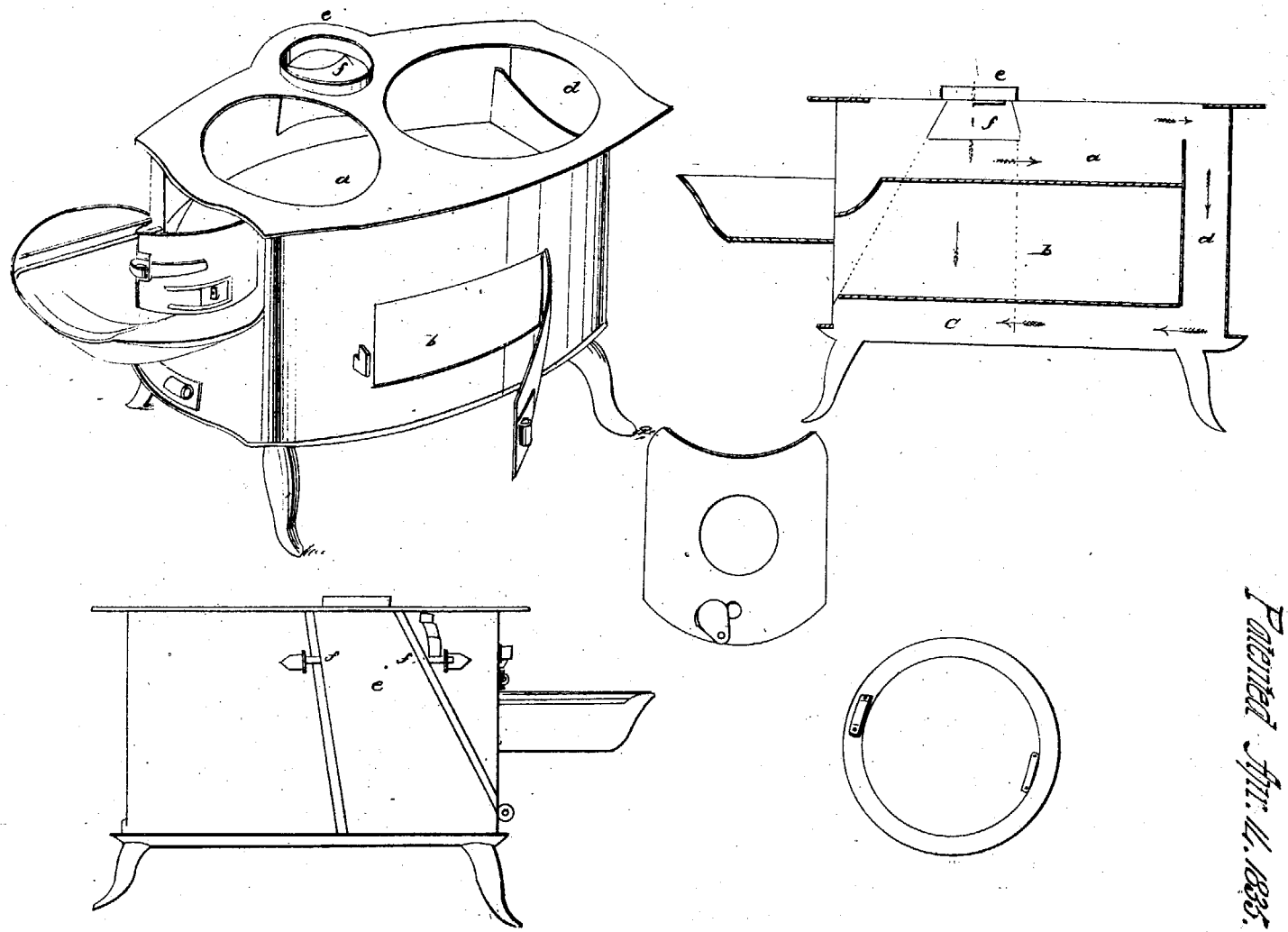

8763X Apl 14, 1835 197

Thaddeus Fairbanks of St Johnsbury Vermont

Letters Patent

The Schedule referred to in these Letters Patent and making part of the same containing a description in the words of the said Thaddeus Fairbanks himself of his improvement in the Cooking Stove To all to whom these presents shall come. Be it known that I Thaddeus Fairbanks of St Johnsbury in the County of Caledonia and State of Vermont have invented certain improvements in the mode of constructing Stoves for cooking and for warming apartments and that the following is a full and exact description thereof. The Stove upon which my improvements are made is of the kind known in many places under the name of the diving Stove and which is so called in consequence of the draft being directed downwards from the fire. before the smoke and heated air make their exit through the ordinary pipe. This Stove is best adapted to the burning of wood. and may be made either square or oval having the general form of the common tin plate Stove. The upper part of the Stove forming the fire place. beneath this is the oven. the lower plate of which constitutes the upper part of a flue. formed between it and the bottom plate of the stove. The door for the supply of fuel is best made at one end. The diving or descending flue which leads to that below the oven being at the other end. a plate rises at the rear of the fire place forming its back. its upper edge terminating at a sufficient distance below the top plate to allow the flame and smoke to pass over it into the back flue.
Openings are made through the top plate to receive cooking utensils. The rising flue leading from the lower flue to the Stove pipe. I form by making an opening from the said lower flue through the side plate of the Stove. near its front end which opening is covered by a curved plate leading from the bottom to the top of the stove where this rising flue connects with the common stove pipe. I generally give to the curved plate forming this rising flue an inclination towards the back end of the Stove so that it may terminate and connect with the pipe at about the middle of the side plate. This rising flue formed by the curved plate as above described constitutes one of my improvements
It is sometimes desirable to allow the draft to escape directly from the fire place
into the flue, without passing down and under the oven. To effect this I
make an opening from the fire place through the side plate into the flue and to this
I adapt a valve or damper which when opened allows the direct escape
and when closed guides the draft underneath the oven. this constitutes my
second improvement — What I claim therefore as my invention is the
before described rising flue formed by the curved plate combined with the
valve or damper, operating in the way and for the purposes described not inten-
ding to claim in any manner the general construction of the Stove with a diving flue
nor any of the individual parts that I have described with the exception
of that which I have above designated as constituting my improvement —

In testimony that the foregoing is a full and accurate description of my
improvement I have hereunto subscribed my hand this fourth day of
March A D 1835.

Cond. Witnesses — Thaddeus Fairbanks
WH Hiram Knapp
George Fairbanks (Drawing.) (616 words)

(Patented 14 April 1835)